June 21, 1960     R. L. VAN ALLEN     2,941,722
SINGLE QUADRANT ANALOGUE COMPUTING MEANS
Filed Aug. 7, 1956
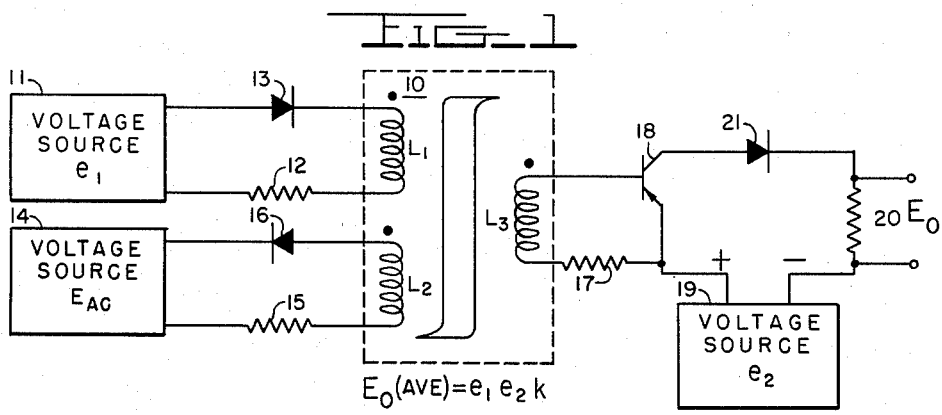
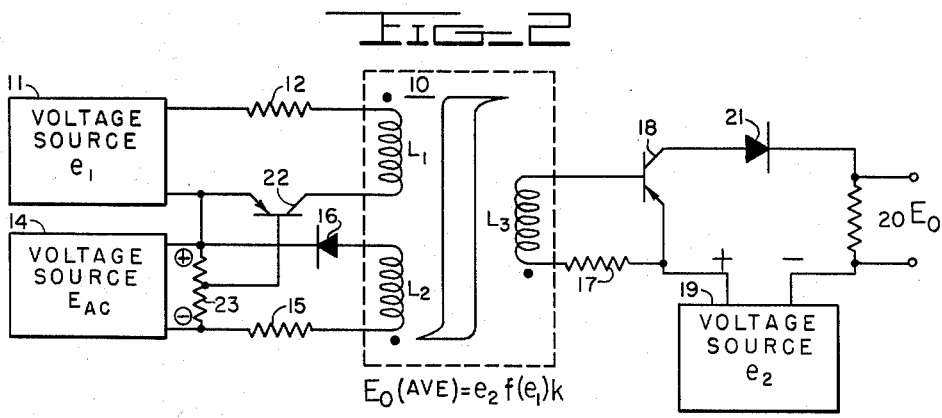
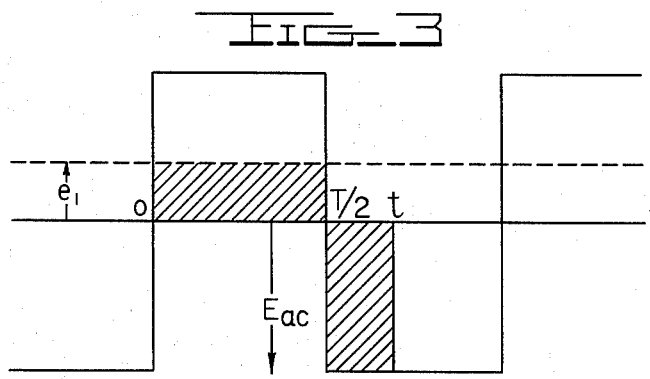
INVENTOR
ROLAND L. VAN ALLEN
BY
ATTORNEYS

United States Patent Office 2,941,722
Patented June 21, 1960

2,941,722

SINGLE QUADRANT ANALOGUE COMPUTING MEANS

Roland L. Van Allen, 957 Swarthmore Drive, Alexandria, Va.

Filed Aug. 7, 1956, Ser. No. 602,676

6 Claims. (Cl. 235—194)

(Granted under Title 35, U.S. Code (1952), sec. 266)

The invention described herein may be manufactured and used by or for the Government of the United States of America for governmental purposes without the payment of any royalties thereon or therefor.

This invention relates in general to analogue computing devices for obtaining a product function of two input voltages and in particular to a static computing device employing magnetic core material characterized by a rectangular hysteresis loop.

A wide variety of electrical, mechanical and electromechanical computing devices are available for combining two input voltages to obtain a third voltage proportional to the sum, difference, product or quotient of the input voltages. Many of these prior art computing devices are characterized by cumbersome size and/or complex circuitry, while others are subject to serious operational limitations. For example, in the electromechanical devices involving error signal servo system, an operator must contend with a considerable follow-up delay.

It will be appreciated that it is sometimes desirable to employ the proportionate function of two voltages as a control voltage, for example, to control the fuel injection rate in a rocket in accordance with power and speed requirements as the rocket ascends. In such an instance, of course, it would be essential that the computing device be especially compact as well as capable of producing a reasonably reliable output control voltage.

Accordingly:

It is an object of this invention to provide a compact high speed computing means for producing an output voltage which is a product function of two input voltages.

It is another object of this invention to provide a static and reasonably accurate magnetic computing means which employs core material having a substantially rectangular hysteresis characteristic.

It is still another object of this invention to provide a magnetic computing means which employs a single core of the rectangular hysteresis loop variety.

It is a further object of this invention to provide a high speed computing means capable of handling high power control circuits.

Other objects of the invention will become apparent upon a more comprehensive understanding of the invention for which reference is had to the attached specification and drawings.

In the drawings:

Fig. 1 is a schematic showing of one embodiment of the invention.

Fig. 2 is a schematic showing of a second embodiment of the invention.

Fig. 3 is a graphical showing of several voltage waveforms as employed in the embodiments of Figs. 1 and 2.

A rectangle is drawn between the transformer windings in Figs. 1 and 2 to indicate a core material having a substantially rectangular hysteresis characteristic.

Briefly, the device of this invention is an analogue computing means which employs a single core transformer utilizing a core material of the rectangular hysteresis variety and a transistorized switching means connected to the windings thereof to obtain a significant output voltage. A basic principle of operation of the device is to store voltage information in a magnetic core of the transformer on one-half cycle and then to read out of the core the same information as a time function on the next half cycle. A pulsed output voltage is obtained wherein the width of each pulse is proportional to one input voltage and the height of each pulse is proportional to the other input voltage. A principal utility of the device is to provide a product function of two input voltages.

Referring now to the drawings:

Fig. 1 depicts a simplified embodiment of the invention which is demonstrative of the basic principle of operation of the invention. In this embodiment a magnetic core material having a substantially rectangular hysteresis loop characteristic is utilized for the transformer 10. Transformer 10 comprises three windings $L_1$, $L_2$ and $L_3$, having the dot indicated winding sense of polarity relationship.

In the exemplary embodiment of Fig. 1, a voltage source 11 is connected via the current limiting impedance 12 across the winding $L_1$ of transformer 10. This circuitry provides a change in flux level of the transformer core material from its original saturation level. It will be seen that this change in flux level is directly proportional to the magnitude of the output $e_1$ of voltage source 11. The direction of this change in flux level of the core material is dependent, of course, upon the direction of current flow in the winding $L_1$. To insure a change in flux level in only one direction with either an A.C. or a pulsating D.C. voltage source 11, a unidirectional element 13 may be inserted in serial connection as shown in the drawing. Obviously, the unidirectional element 13 may be omitted if the voltage source 11 provides a pulsating D.C. output.

As a means for returning the core material to its original flux level, a voltage source 14 is connected, in a manner similar to that described above via the current limiting impedance 15 across the winding $L_2$ of transformer 10. Again, the change in flux level is proportional to the magnitude of the output of the voltage source. Likewise, the unidirectional element 16 shown in the drawing serves the same purpose as the unidirectional element 13 and may be omitted if the voltage source 14 provides a pulsating D.C. output. For reasons which will become apparent hereinafter, it is essential to this simplified embodiment of the invention that the voltage source 14 provide an output of constant amplitude, periodically recurring pulses, for example, a rectified square wave, and that the output voltage be of sufficient magnitude to overcome the change in flux level produced by the highest anticipated output of voltage source 11. Preferably, the output of voltage source 14 should be of sufficient magnitude to bring the core material from one saturation level to the other.

The winding $L_3$ of transformer 10 is connected, via current limiting impedance 17, to a voltage sensitive switching means 18 which is operative to connect the output voltage $e_2$ of voltage source 19 across the load impedance 20. A unidirectional element 21 is shown in serial connection between voltage source 19 and load impedance 20 to permit the use of either an A.C. or D.C. voltage source 19. The switching means 18 is responsive to the magnitude and polarity of the voltage across the winding $L_3$ and is so connected to complete the circuit which applies voltage source 19 across the load impedance 20 during the time interval required to return the core material to its original saturation level. Thus the switching means is closed during the reset saturating period but once saturation takes place, the voltage across the winding drops to a minimum and opens the switch.

In the exemplary embodiment of Fig. 1, a single PNP type transistor is shown connected as the switching means 18. While other types of voltage sensing switching means might be employed where, for example, size is not a factor, it has been found that transistor switching means are particularly adaptable to the present invention and afford considerable advantage thereto.

In basic explanation of the operation of a PNP type transistor as a switching element, the collector to emitter impedance of such transistors is very high when both the collector and emitter voltages are equal to or more negative than the base voltage. As soon as the base becomes slightly negative with respect to both collector or emitter, however, the emitter-collector impedance drops to the vicinity of one ohm.

In Fig. 1, the emitter and base of the transistor switching means 18 are connected across the winding $L_3$. Thus when the voltage source 11 is instrumental in changing the flux level of the core material the transistor will not be in the conducting state since this applied a positive bias to the base. In the other case, when the voltage source 14 is returning the core material to its original saturation level, a negative voltage is applied to the base circuit, the transistor conducts and the output $e_2$ of voltage source 19 appears across the load impedance 20.

In operational analysis of this invention, the change in flux of a core material having a substantially rectangular hysteresis loop characteristic may be expressed by $$\phi = K \int_0^{t/2} e\, dt \text{ volt-seconds}$$

where K is a constant for the particular core, and $\phi$ is the total change in flux produced by a voltage $e$ applied to a winding on the core for a period of time $t/2$. If the core is always saturated at one knee of the hysteresis loop when the voltage $e$ is applied and the polarity of $e$ is chosen to produce a flux change toward the opposite knee, then the change in flux produced by $e$ will be proportional to the average value of $e$ for the time period $t/2$. The core will thus integrate the voltage $e$ and this volt-second integral will be read in and stored as a flux level within the hysteresis loop.

By applying a constant magnitude voltage to return the core material to its original saturation level this volt-second information may be read out on a time basis. The time required for read out, that is, to return to the original saturation level, is then proportional to the magnitude of the voltage $e$ read in, since the volt-seconds read out equals the volt-seconds read in. In other words, the same value of the integral is obtained in the first case for a variable voltage and constant time and in the second case for a constant voltage and variable time.

Fig. 2 depicts another embodiment of the invention similar to that of Fig. 1 but incorporating a PNP type transistor 22 in place of the unidirectional element 13. In operational analysis of this particular embodiment, when the output $E_{ac}$ of voltage source 14 has the indicated polarity, a negative potential is applied to the base of the transistor 22 from the tapped resistance 23 connected across the voltage source 14 and, as explained heretofore, the emitter-collector impedance of the transistor 22 is low. Thus, when the output $E_{ac}$ of voltage source 14 has the indicated polarity, the output $e_1$ of voltage source 11 is applied directly across the winding $L_1$ to change the flux level from positive saturation to some flux level between positive and negative saturation, the amount of change being proportional to the magnitude of $e_1$. During this half cycle, of course, the emitter-collector impedance of transistor switching means 18 is high and no voltage appears across the output impedance 20.

When the output $E_{ac}$ of voltage source 14 has a polarity opposite to that shown in Fig. 2 the unidirectional element 16 no longer blocks current flow and the voltage $E_{ac}$ is applied directly across the winding $L_2$ in such directions as to return the flux level of the core to positive saturation. Again, as in the embodiment of Fig. 1, the transistor switching means 18 conducts during the reset period until the original saturation level is reached.

Fig. 3 graphically depicts the D.C. output $e_1$ of voltage source 11 and the A.C. output $E_{ac}$ of voltage source 14 with the time interval during which each voltage source is effective to alter the flux level of the core material indicated by the crosshatched area. It will be noted that each voltage source is effective only during its respective read-in or read-out half cycle.

Since in the embodiment of Fig. 1 and Fig. 2 it is the output $E_{ac}$ of voltage source 14 which establishes the read-in interval, between time zero and time $T/2$, and the read-out interval, between time $T/2$ and time $t$, it will be appreciated that a square wave output such as shown in Fig. 3 is to be preferred. It is, of course, within the purview of this invention to employ a constant D.C. supply as the voltage source 14 and to employ an auxiliary time regulated switching means for establishing the read-in and read-out time intervals, if desired.

As previously discussed the output $e_2$ of voltage source 19 is continuously applied only during the read-out interval $T/2$ to $t$. Therefore it will be seen that a repetitive pulse output appears across the load impedance 20, wherein the pulse width is proportional to $e_1$, the pulse height is proportional to $e_2$ and the repetition rate is determined by the frequency of the voltage source 14 output. Considering the simple case where the voltages $e_1$ and $e_2$ are of constant amplitude, it will be seen that the average output voltage across the load impedance 20 is proportional to the product of $e_1$ and $e_2$.

While for purposes of simplicity, in the above operational analysis of the embodiments of this invention disclosed herein each of the voltage source outputs $e_1$, $e_2$ and $E_{ac}$ have been considered to have a constant amplitude it should be understood that it is not essential to this invention that this be the case. It can be shown by a more complex mathematical analysis that if $E_1 = E_1 f_1(t)$, $E = E f_E(t)$ and $e_2 = e_2 f_2(t)$ the product of $e_1 e_2(t)$ is the same function of time as $f_E(t)$. The only restrictions on the variable $e_1$ are that its volt-time average over the period of a half cycle does not saturate the core and, if it is an A.C. voltage, that it does not reverse polarity within each half cycle. In other words, in determining the frequency of the A.C. voltage $e_1$, the frequency of $E_{AC}$ must be considered. Moreover, as in the constant amplitude case described above, the simplest consideration to be made in operational analysis of the several embodiments is the square wave case. Of course, this is not to imply that only a square wave A.C. voltage $e_1$ may be employed, other waveforms being suitable for the purpose.

As pointed out earlier, in order to realize the maximum range of values for the variable $e_1$ and to have half cycle response to read-out, the magnitude of the voltage $E_{ac}$ should be large enough to saturate the core in one half cycle at the operating frequency of the system which might be, for example, 2 kc. Further, it has been found that as the operating frequency of the system is increased above 2 k.c., the accuracy of the system deteriorates due in part to a change in the hysteresis characteristic of the core material and in part to the inherent switching limitations of the transistor at higher frequencies.

It will be seen that the embodiments of this invention exemplarily described in detail above may be ruggedly constructed in an extremely light and compact manner. It will be seen that the power handling capacity of the invention is only limited by the power handling capacity of the switching means 18. In addition, it has been found that these embodiments are relatively unaffected by temperature conditions. An average accuracy of $\pm 1.0\%$ has been obtained with these embodiments. It is seen that by a more discriminative selection of the core material and transistor components of the circuit greater accuracy may be readily attainable.

Finally, it is understood that this invention is to be limited only by the scope of the claims appended hereto.

What is claimed is:

1. An analogue computing device comprising a plurality of mutually inductive windings; said plurality of windings being wound on a core of a material having a substantially rectangular hysteresis characteristic with two predetermined saturation levels; a first voltage source; means for applying said first voltage source across a first winding of said plurality such as to effect a change in flux level from one of said saturation levels, said change in flux level being proportional to the magnitude of the voltage applied; a second voltage source; means for applying said second voltage source across a second winding of said plurality, in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; an output load impedance; a third voltage source; on-off switching means having control means for controlling the operational state thereof, means connecting said control means to a third winding in said plurality such that said switching means is responsive to a voltage thereacross and said operational state is determined thereby; means serially connecting said third voltage source and said on-off switching means across said output load impedance; said switching means being operative to apply said third voltage source across said load impedance for the period required for said core material to be returned to said original saturation level by said second voltage source.

2. An analogue computing device comprising a core material having a substantially rectangular hysteresis characteristic with two predetermined saturation levels; a plurality of mutually inductive windings wound thereon; a first voltage source; means for applying said first voltage source across a first winding of said plurality such as to effect a change in flux level from one of said saturation levels, said change in flux level being proportional to the magnitude of the voltage applied; a second voltage source; means for applying said second voltage source across a second winding of said plurality, in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; said means for applying said second voltage source including a current limiting impedance for controlling the amount of current flow in the circuit once a saturation level is reached; an output load impedance; a third voltage source; on-off switching means having control means for controlling the operational state thereof, means connecting said control means to a third winding in said plurality such that said switching means is responsive to a voltage thereacross and said operational state is determined thereby; means serially connecting said third voltage source and said on-off switching means across said output load impedance; said switching means being operative to apply said third voltage source across said load impedance for the period required for said core material to be returned to said original saturation level by said second voltage source.

3. An analogue computing device comprising a core material having a substantially rectangular hysteresis characteristic with two predetermined saturation levels; a plurality of mutually inductive windings wound thereon; a first voltage source; means for applying said first voltage source across a first winding of said plurality such as to effect a change in flux level from one of said saturation levels, said change in flux level being proportional to the magnitude of the voltage applied; a second voltage source; means for applying said second voltage source across a second winding of said plurality, in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; an ouput load impedance; a third voltage source; plus a transistor switching means electrically connected to a third winding in said plurality and responsive to the voltage thereacross; said switching means being operative to apply said third voltage source across said load impedance for the period required for said core material to be returned to said original saturation level by said second voltage source.

4. An analogue computing device comprising a core material having a substantially rectangular hysteresis characteristic with two predetermined saturation levels; a plurality of mutually inductive windings wound thereon; a first voltage source; means for applying said first voltage source across a first winding of said plurality such as to effect a change in flux level from one of said saturation levels, said change in flux level being proportional to the magnitude of the voltage applied; a second voltage source; means for applying said second voltage source across a second winding of said plurality in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; an output load impedance; a third voltage source; plus a PNP type transistor switching means having base and emitter connections thereof connected across a third winding in said plurality and responsive to the polarity and magnitude of the voltage thereacross; said switching means being operative to apply said third voltage source across said load impedance for the period required for said core material to be returned to said original saturation level by said second voltage source.

5. An analogue computing device comprising a core material having a substantially rectangular hysteresis characteristic with two predetermined saturation levels; a plurality of mutually inductive windings wound thereon; a first voltage source; means for applying said first voltage source across a first winding of said plurality such as to effect a change in flux level from one of said saturation levels, said change in flux level being proportional to the magnitude of the voltage applied; a second voltage source; means for applying said second voltage source across a second winding of said plurality, in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; an output load impedance; a third voltage source; plus a PNP type transistor switching means having base and emitter connections thereof connected across a third winding in said plurality and responsive to the voltage thereacross; a unidirectional element; said switching means being operative to apply said third voltage source through said unidirectional element across said load impedance for the period required for said core material to be returned to said original saturation level by said second voltage source.

6. An analogue computing device comprising a core material having a substantially rectangular hysteresis characteristic with two predetermined saturation levels; a plurality of mutually inductive windings wound thereon; a first voltage source; means for applying said first voltage source across a first winding of said plurality such as to effect a change in flux level from one of said saturation levels, said change in flux level being proportional to the magnitude of the voltage applied; a second voltage source having an output of constant magnitude; means for applying said second voltage source across a second winding of said plurality, in sequential time relation to the application of said first voltage source across said first winding, such as to effect a change in flux level in opposite direction to that produced by said first voltage source; the magnitude of the output of said second voltage source and the period of application across said second winding being sufficient to return said core material to its original saturation level; an output load impedance; a third voltage source; on-off switching means having control means for controlling the operational state thereof, means connecting said control means to a third winding in said plurality such that said switching means is responsive to a voltage thereacross and said operational state is determined thereby; means serially connecting said third voltage source and said on-off switching means across said output load impedance; said switching means being operative to apply said third voltage source across said load impedance for the period required for said core material to be returned to said original saturation level by said second voltage source.

References Cited in the file of this patent

UNITED STATES PATENTS

| | | |
|---|---|---|
| 2,760,088 | Pittman et al. | Aug. 21, 1956 |
| 2,773,132 | Bright | Dec. 4, 1956 |
| 2,783,456 | Steagall | Feb. 26, 1957 |
| 2,898,043 | Mathias | Aug. 4, 1959 |

OTHER REFERENCES

Trans. of the AIEE (Van Allen) Nov. 1955, pages 643–647.

Trans. of the AIEE (Schaefer and Van Allen) May, 1956, pages 160–165.